Patented Mar. 27, 1951

2,546,477

UNITED STATES PATENT OFFICE 2,546,477

CLAY BODIES AND METHOD OF PRODUCING SAME

Nathan R. Sewell, Jr., Raleigh, N. C.

No Drawing. Application March 10, 1948,
Serial No. 14,165

3 Claims. (Cl. 106—72)

This invention relates to an improvement in the present method of commercially preparing stiff mud bodies and has for its primary object the improvement of the drying shrinkage, the firing shrinkage, the dry and fired strengths, the adsorption, and the porosity of stiff mud or clay bodies by the use of a wetting agent in certain critical amounts.

Commercially, the preparation of stiff mud or clay bodies is accomplished by a de-airing process which involves passing them through a vacuum chamber. Difficulties in maintaining a good vacuum, power costs and work stoppages due to clogged vacuum chambers, are some of the problems confronted. It was thought that perhaps, a very definite contribution could be made in the field of ceramic engineering if some method could be devised for preparing a workable ceramic body of good dry and fired properties without the use of a vacuum chamber. In attacking the problem, it was remembered that the ancient Chinese achieved the desired properties in their clay bodies through aging. It is now generally agreed that the advantages gained by aging a clay-water mass are due to the more complete distribution of the water, which is accomplished as a result of the long time interval involved. The real problem, therefore, is to find a way to eliminate both aging and de-airing by adding compounds or mixtures which are better wetting agents than water, due to their lower surface tension.

The use of wetting agents immediately suggests itself and the literature discloses the use of certain organic wetting agents to improve the properties of clay bodies. However, the problem is not one merely of any wetting agent, but a particular wetting agent and using it in such amounts as to obtain a desired degree of wetting. To this end, a series of experiments were run, and results were obtained which form the basis of the instant invention.

Clays employed

In the selection of the clays for experimental work, an attempt was made, in a general way, to cover the field of ceramics. The first clay selected was a red surface clay from Jackson, Missouri, having small grain size and high plasticity, and maturing at about cone 4. The formula for this red surface clay is $Al_2O_3.SiO_2.2H_2O.5Fe_2O_3$. The second test body was a semi-vitreous whiteware body maturing at cone 8–9, and having the following composition:

30% potter's flint
30% Georgia kaolin
5% Kentucky #12, A–F (black ball) ball clay
15% keystone feldspar
18% Florida kaolin
2% whiting The analysis of (black ball) ball clay is as follows:

| | Per cent |
|---|---|
| $Al_2O_3$ | 40 |
| $SiO_2$ | 45 |
| Carbon | 5 |
| $H_2O$ | 10 |

The third was a cone 14 fireclay refractory body of the following composition:

18% 4–10 mesh grog
49% semi-flint clay (thru 6 mesh)
33% flint clay (thru 3 mesh)

The wetting agent selected was oleic acid. On the basis of the water content of the clay bodies, the following percentages of oleic acid were employed: 0.5%, 1.0%, 2.0%, 4.0%, 8.0%, 16.0%, 32.0%.

Experimental method

For each clay and every composition, ten pounds of the clay were mixed dry for five minutes in a food mixer, then the wetting agent added, followed by five minutes more of mixing. With the red clay and the whiteware body, two pounds of water were then added, and the mixing continued for fifteen minutes. In the case of the refractory body, one and one-half pounds of water were added. Each batch was stored overnight and test pieces were made according to specifications of the ASTM. The same method was employed for a de-aired body of each of the three clay compositions, with the exception that no additions of the wetting agent was made, and they were de-aired in a vacuum chamber for fifteen minutes at 28.5 inches of mercury.

The pieces were then air dried for thirty hours and tested for linear drying shrinkage and dry transverse strength, according to ASTM specifications. At this time, the dry volume measurements were made in a kerosene volumeter, after soaking under vacuum for two hours in kerosene.

The red clay pieces were fired to cone 5 in thirty-one hours. The whiteware was fired to cone 8–9 in thirty hours and thirty minutes, and the fireclay refractory body was fired to cone 14 in twenty hours. All pieces were fired in a "Globar" resistance furnace under the same conditions, and cones placed throughout the kiln indicated that the piece in each body received exactly the same heat treatment. After firing, the linear shrinkage, volume firing shrinkage, fired transverse strength, apparent porosity, and percent adsorption were measured and calculated according to ASTM specifications. For all tests, the results reported are presented as follows:

*Missouri red clay dry linear shrinkage*

| | Per cent |
|---|---|
| De-aired | 4.0 |
| 0.5% oleic acid | 5.1 |
| 1.0% oleic acid | 5.7 |
| 2.0% oleic acid | 4.7 |
| 4.0% oleic acid | 5.7 |
| 8.0% oleic acid | 4.8 |
| 16.0% oleic acid | 5.1 |
| 32.0% oleic acid | 4.9 |

*Missouri red clay dry modulus of rupture*

| | P. S. I. |
|---|---|
| De-aired | 275 |
| 0.5% oleic acid | 600 |
| 1.0% oleic acid | 540 |
| 2.0% oleic acid | 560 |
| 4.0% oleic acid | 640 |
| 8.0% oleic acid | 560 |
| 16.0% oleic acid | 275 |
| 32.0% oleic acid | 215 |

*Missouri red clay fired linear shrinkage*

| | Per cent |
|---|---|
| De-aired | 2.7 |
| 0.5% oleic acid | 3.6 |
| 1.0% oleic acid | 6.2 |
| 2.0% oleic acid | 5.3 |
| 4.0% oleic acid | 5.7 |
| 8.0% oleic acid | 3.3 |
| 16.0% oleic acid | 4.4 |
| 32.0% oleic acid | 3.6 |

*Missouri red clay fired volume shrinkage*

| | Per cent |
|---|---|
| De-aired | 17.9 |
| 0.5% oleic acid | 18.3 |
| 1.0% oleic acid | 18.8 |
| 2.0% oleic acid | 18.4 |
| 4.0% oleic acid | 19.8 |
| 8.0% oleic acid | 18.3 |
| 16.0% oleic acid | 20.4 |
| 32.0% oleic acid | 17.3 |

*Missouri red clay fired modulus of rupture*

| | P. S. I. |
|---|---|
| De-aired | 1225 |
| 0.5% oleic acid | 3400 |
| 1.0% oleic acid | 3850 |
| 2.0% oleic acid | 3580 |
| 4.0% oleic acid | 3355 |
| 8.0% oleic acid | 3470 |
| 16.0% oleic acid | 2860 |
| 32.0% oleic acid | 2340 |

*Missouri red clay percent absorption*

| | Per cent |
|---|---|
| De-aired | 1.5 |
| 0.5% oleic acid | 4.1 |
| 1.0% oleic acid | 4.3 |
| 2.0% oleic acid | 5.0 |
| 4.0% oleic acid | 4.5 |
| 8.0% oleic acid | 3.7 |
| 16.0% oleic acid | 2.9 |
| 32.0% oleic acid | 7.4 |

*Missouri red clay apparent porosity*

| | Per cent |
|---|---|
| De-aired | 3.9 |
| 0.5% oleic acid | 8.9 |
| 1.0% oleic acid | 9.6 |
| 2.0% oleic acid | 11.0 |
| 4.0% oleic acid | 9.9 |
| 8.0% oleic acid | 8.6 |
| 16.0% oleic acid | 6.0 |
| 32.0% oleic acid | 15.9 |

*Cone 8 whiteware dry linear shrinkage*

| | Per cent |
|---|---|
| De-aired | 2.9 |
| 0.5% oleic acid | 2.6 |
| 1.0% oleic acid | 2.9 |
| 2.0% oleic acid | 2.6 |
| 4.0% oleic acid | 2.3 |
| 8.0% oleic acid | 3.2 |
| 16.0% oleic acid | 2.2 |
| 32.0% oleic acid | 2.9 |

*Cone 8 whiteware dry modulus of rupture*

| | P. S. I. |
|---|---|
| De-aired | 110 |
| 0.5% oleic acid | 103 |
| 1.0% oleic acid | 111 |
| 2.0% oleic acid | 118 |
| 4.0% oleic acid | 143 |
| 8.0% oleic acid | 140 |
| 16.0% oleic acid | 93 |
| 32.0% oleic acid | 81 |

*Cone 8 whiteware fired linear shrinkage*

| | Per cent |
|---|---|
| De-aired | 5.9 |
| 0.5% oleic acid | 6.1 |
| 1.0% oleic acid | 5.7 |
| 2.0% oleic acid | 4.9 |
| 4.0% oleic acid | 4.3 |
| 8.0% oleic acid | 5.0 |
| 16.0% oleic acid | 5.2 |
| 32.0% oleic acid | 4.4 |

*Cone 8 whiteware fired volume shrinkage*

| | Per cent |
|---|---|
| De-aired | 9.7 |
| 0.5% oleic acid | 10.3 |
| 1.0% oleic acid | 5.7 |
| 2.0% oleic acid | 5.8 |
| 4.0% oleic acid | 7.0 |
| 8.0% oleic acid | 11.4 |
| 16.0% oleic acid | 10.9 |
| 32.0% oleic acid | 15.0 |

*Cone 8 whiteware fired modulus of rupture*

| | P. S. I. |
|---|---|
| De-aired | 3000 |
| 0.5% oleic acid | 2405 |
| 1.0% oleic acid | 2900 |
| 2.0% oleic acid | 1600 |
| 4.0% oleic acid | 2610 |
| 8.0% oleic acid | 2465 |
| 16.0% oleic acid | 2445 |
| 32.0% oleic acid | 2400 |

*Cone 8 whiteware apparent porosity*

| | Per cent |
|---|---|
| De-aired | 19.3 |
| 0.5% oleic acid | 21.6 |
| 1.0% oleic acid | 21.0 |
| 2.0% oleic acid | 25.1 |
| 4.0% oleic acid | 26.1 |
| 8.0% oleic acid | 22.8 |
| 16.0% oleic acid | 22.6 |
| 32.0% oleic acid | 30.9 |

Cone 8 whiteware percent absorption

|  | Per cent |
|---|---|
| De-aired | 7.6 |
| 0.5% oleic acid | 8.2 |
| 1.0% oleic acid | 8.3 |
| 2.0% oleic acid | 10.2 |
| 4.0% oleic acid | 10.1 |
| 8.0% oleic acid | 8.8 |
| 16.0% oleic acid | 8.6 |
| 32.0% oleic acid | 11.7 |

Cone 14 refractory fireclay dry linear shrinkage

|  | Per cent |
|---|---|
| De-aired | 2.4 |
| 0.5% oleic acid | 2.6 |
| 1.0% oleic acid | 2.3 |
| 2.0% oleic acid | 2.4 |
| 4.0% oleic acid | 1.5 |
| 8.0% oleic acid | 2.4 |
| 16.0% oleic acid | 1.9 |
| 32.0% oleic acid | 2.2 |

Cone 14 refractory fireclay dry modulus of rupture

|  | P.S.I. |
|---|---|
| De-aired | 70 |
| 0.5% oleic acid | 66 |
| 1.0% oleic acid | 92 |
| 2.0% oleic acid | 94 |
| 4.0% oleic acid | 55 |
| 8.0% oleic acid | 58 |
| 16.0% oleic acid | 44 |
| 32.0% oleic acid | 48 |

Cone 14 refractory fireclay fired linear shrinkage

|  | Per cent |
|---|---|
| De-aired | 4.1 |
| 0.5% oleic acid | 4.2 |
| 1.0% oleic acid | 4.9 |
| 2.0% oleic acid | 5.3 |
| 4.0% oleic acid | 3.7 |
| 8.0% oleic acid | 3.1 |
| 16.0% oleic acid | 3.5 |
| 32.0% oleic acid | 4.1 |

Cone 14 refractory fireclay fired volume shrinkage

|  | Per cent |
|---|---|
| De-aired | 16.3 |
| 0.5% oleic acid | 15.0 |
| 1.0% oleic acid | 15.4 |
| 2.0% oleic acid | 20.5 |
| 4.0% oleic acid | 19.0 |
| 8.0% oleic acid | 16.2 |
| 16.0% oleic acid | 16.2 |
| 32.0% oleic acid | 17.5 |

Cone 14 refractory fireclay fired modulus of rupture

|  | P.S.I. |
|---|---|
| De-aired | 505 |
| 0.5% oleic acid | 825 |
| 1.0% oleic acid | 1160 |
| 2.0% oleic acid | 1545 |
| 4.0% oleic acid | 795 |
| 8.0% oleic acid | 525 |
| 16.0% oleic acid | 505 |
| 32.0% oleic acid | 650 |

Cone 14 refractory fireclay apparent porosity

|  | Per cent |
|---|---|
| De-aired | 18.8 |
| 0.5% oleic acid | 20.4 |
| 1.0% oleic acid | 20.3 |
| 2.0% oleic acid | 20.0 |
| 4.0% oleic acid | 19.5 |
| 8.0% oleic acid | 18.5 |
| 16.0% oleic acid | 19.6 |
| 32.0% oleic acid | 20.1 |

Cone 14 refractory fireclay percent absorption

|  | Per cent |
|---|---|
| De-aired | 8.7 |
| 0.5% oleic acid | 9.6 |
| 1.0% oleic acid | 9.6 |
| 2.0% oleic acid | 9.6 |
| 4.0% oleic acid | 9.6 |
| 8.0% oleic acid | 9.6 |
| 16.0% oleic acid | 9.3 |
| 32.0% oleic acid | 9.7 |

From the results here presented, it appears that it is possible, in most clay bodies, to improve the dry shrinkage, the firing shrinkage, the dried and fired strength, and the adsorption and porosity, by substituting certain additions of oleic acid for the de-airing process. The oleic acid will give good workable bodies with improvement in the important dried and fired properties, in amounts as low as 0.5% of the water content of the clay-water mass and in amounts as high as 8.0% of the oleic acid employed.

It is probable that the reason for the improvements with addition of oleic acid is a more thorough and even distribution of liquid throughout the clay-water mass, the dry strength being improved because of the high adhesive strength.

In view of the foregoing description it is believed that a clear understanding of the advantages of the invention will be quite apparent to those skilled in this art. A more detailed description is accordingly deemed unnecessary. It is to be understood, however, that the same is susceptible to certain changes fully comprehended by the spirit of the invention as herein described and the scope of the appended claims.

Having described the invention what is claimed as new is:

1. A clay-water mass consisting of a semi-vitreous whiteware body maturing at cone 8-9 having the following composition: 30% potter's flint, 15% keystone feldspar, 30% Georgia kaolin, 18% Florida kaolin, 5% Kentucky #12, A-F ball clay, 2% whiting; and oleic acid in the amount of 0.5 to 8.0% by weight of the water.

2. A clay-water mass including a cone 14 fireclay refractory body of the following composition: 18% 4-10 mesh grog, 49% semi-flint clay, 33% flint clay; and oleic acid in the amount of 0.5 to 8.0% by weight of the water.

3. A method of producing clay-water masses with improved drying shrinkage, firing shrinkage, dry and fired strength, adsorption and porosity consisting of adding oleic acid to a dry clay with agitation, adding water and continuing the agitation for fifteen minutes, and finally air drying the mixture for thirty hours, said oleic acid being added in an amount of 0.5 to 8.0% by weight of the water.

NATHAN R. SEWELL, Jr.

REFERENCES CITED

The following references are of record in the file of this patent:

UNITED STATES PATENTS

| Number | Name | Date |
|---|---|---|
| 1,001,413 | Keppeler et al. | Aug. 22, 1911 |
| 2,388,446 | Straight | Nov. 6, 1945 |